(12) United States Patent
Cohen (10) Patent No.: US 8,930,842 B2
(45) Date of Patent: Jan. 6, 2015

(54) METHOD FOR GENERATING A SEARCH QUERY

(75) Inventor: Michael Cohen, The Hague (NL)

(73) Assignee: Xelion B.V., Delft (NL)

( * ) Notice: Subject to any disclaimer, the term of this patent is extended or adjusted under 35 U.S.C. 154(b) by 213 days.

(21) Appl. No.: 13/518,521

(22) PCT Filed: Dec. 23, 2010

(86) PCT No.: PCT/EP2010/070642
§ 371 (c)(1),
(2), (4) Date: Aug. 31, 2012

(87) PCT Pub. No.: WO2011/076919
PCT Pub. Date: Jun. 30, 2011

(65) Prior Publication Data
US 2012/0324395 A1 Dec. 20, 2012

(30) Foreign Application Priority Data
Dec. 24, 2009 (EP) ..................................... 09180755

(51) Int. Cl.
*G06F 17/30* (2006.01)
(52) U.S. Cl.
CPC .... *G06F 17/30643* (2013.01); *G06F 17/30637* (2013.01); *G06F 17/30634* (2013.01)
USPC ........................................................ 715/780
(58) Field of Classification Search
None
See application file for complete search history.

(56) References Cited

U.S. PATENT DOCUMENTS

| | | | |
|---|---|---|---|
| 5,428,735 A * | 6/1995 | Kahl et al. | 715/839 |
| 8,479,118 B2 * | 7/2013 | Lyndersay et al. | 715/809 |
| 2005/0110777 A1 * | 5/2005 | Geaghan et al. | 345/179 |
| 2007/0143264 A1 | 6/2007 | Szeto | |
| 2007/0157129 A1 * | 7/2007 | Facemire et al. | 715/968 |

FOREIGN PATENT DOCUMENTS

WO    WO 01/75681    10/2001

OTHER PUBLICATIONS

International Search Report for PCT/EP2010/070642 mailed Apr. 19, 2011.
Written Opinion of the International Searching Authority mailed Apr. 19, 2011.

* cited by examiner

*Primary Examiner* — Stephen Alvesteffer
*Assistant Examiner* — Daniel Samwel
(74) *Attorney, Agent, or Firm* — Nixon & Vanderhye, PC (57) ABSTRACT

A method and an electronic device (10) for generating a search query using a graphical user interface are provided. The method comprises providing (111) a graphical representation of a search input field (20) comprising at least two domain icons (21-25, 91-97), each domain icon (21-25, 91-97) representing a search domain, activating (112) of the search input field (20) upon a user selection of one of the at least two domain icons (21-25, 91-97), receiving (113) a search string (34) entered by a user, and generating (114) the search query based on the entered search string (34) and the search domain represented by the selected domain icon (21-25, 91-97).

11 Claims, 11 Drawing Sheets

METHOD FOR GENERATING A SEARCH QUERY

This application is the U.S. national phase of International Application No. PCT/EP2010/070642 filed 23 Dec. 2010 which designated the U.S. and claims priority to EP 09180755.2 filed 24 Dec. 2009, the entire contents of each of which are hereby incorporated by reference.

FIELD OF THE INVENTION

This invention relates to a method for generating a search query using a graphical user interface, the method comprising providing a graphical representation of a search input field, activating of the search input field upon a user selection, receiving a search string entered by a user, user selection of a search domain and generating the search query based on the entered search string and the selected search domain.

This invention further relates to an electronic device comprising a display, an input means and a processing means, all operatively coupled in order to provide a graphical user interface, the processor being configured to generate a search query in accordance with the method according to the invention.

This invention further relates to a computer program product for generating a search query in accordance with the method according to the invention.

BACKGROUND OF THE INVENTION

In many software applications large amounts of stored data is available for being read, viewed, edited or deleted or for being used in any other way. The more data available in an application, the more important it is to provide an efficient and user friendly user interface for allowing a user to search for specific data. When a user wants to find information available through the internet, the amount of available data to search through is enormous. Software developing companies like Google, Yahoo and Microsoft provide a lot of different websites and Internet browser applications for enabling searching through the information available on the Internet.

In many online and offline search applications, a search input field is provided for enabling a user to enter a search string. The user uses, e.g., a keyboard for entering one or more relevant words to search for and instructs the search application to look for data matching the entered search string. If the data collection in which to look for matching data is very large, the searching may take a lot of time and the amount of search results provided may be so large that it is very difficult for the user to find the results searched for.

Because the above mentioned problems, the size of the data collection to search in is often limited by allowing the user to select a search domain in addition to the search string. On the Google website, e.g., it is possible to search for text, images, videos, 'stuff to buy' or geographical data available in Google maps. When selecting one of these search domains (by clicking on a hyperlink), the Internet browser application loads a search domain specific website with a search input field. In that search input field, the user enters a search string. By pressing a 'search' button or hitting the 'return' key on the keyboard, a search for the search string in the specific search domain is started. One disadvantage of the Google website is that when a user selects a new search domain, a corresponding web page is loaded and displayed. Loading a new web page costs processing power, network bandwidth and, more important, time.

A further software product provided by Google is the Google Toolbar, which does not need to load a new web page when the user selects a new search domain. The Google Toolbar is available for different Internet browser applications and comprises a search input field accompanied by separate search buttons for different search domains, a search input field accompanied by a separate drop down list representing the search buttons for the different domains or a drop down list with separate search input fields for different search domains. A difference between the toolbar and the website based search entry field is that it does not require loading and displaying of complete web pages just to select a different domain. However searching within the desired search domain still involves multiple user interactions like navigating a (mouse) pointer, clicking on specific input fields, links or buttons, typing a search string.

OBJECT OF THE INVENTION

It is therefore an object of the invention to provide a method for generating a search query in a more efficient way and to make it even easier for a user to obtain relevant search results.

SUMMARY OF THE INVENTION

According to a first aspect of the invention, this object is achieved by providing a method for generating a search query using a graphical user interface, the method comprising providing a graphical representation of a search input field comprising at least two domain icons, each domain icon representing a search domain, activating of the search input field upon a user selection of one of the at least two domain icons, receiving a search string entered by a user, and generating the search query based on the entered search string and the search domain represented by the selected domain icon.

The inclusion of the search domain icons in the search input field makes it possible to combine two user interactions that used to require two separate acts. Now, with only one act, the user simultaneously selects a search domain and activates the search input field. This one act may take many different forms. It may, e.g., involve clicking on one of the search domain icons, moving a pointer over the search domain icon to be selected or using a short key. Alternatively, the user may go through the different search domain icons using, e.g., an arrow or tab key. However in that way, the advantage of the reduced amount of required user acts is not obtained.

An additional advantage of the method according to the invention is that it requires less space for displaying all user interface elements. The search domain icons are integrated with the search input field and do not need any separate space. The space that is not used for search domain icons may, e.g., be used for providing a wider search input field.

In a preferred embodiment of the method according to the invention, the search domain icons are highlighted when a pointer is moved over said icons. Highlighting may be achieved by, e.g., enlarging the icon, changing its color, using an animation effect or changing the representation of the icon in such a way that it appears to come from the background into the foreground. The standard representation of the search domain icon (when it is not selected) may, e.g., be a smaller, semi-transparent or less colorful representation. The moving of the pointer is typically obtained by means of a mouse, track ball, touchpad, joystick or other type of pointing device.

The search query may be generated when the user gives a sign that the complete search string has been entered. Such a sign will typically be provided by pressing the 'return' key or clicking on a button. Optionally, any amendment of the search string in the search input field triggers the generating and performing of the search query or a filtering of results from an earlier search query based on the entered search string. Alternatively, changing the search string may result in a list with popular search words similar to the current search string. This will make it possible for the user to see search results appearing while he is still typing the search string. If the user has already found what he is looking for before the complete search string has been entered, he may immediately stop entering the search string and start using the search results.

These and other aspects of the invention are apparent from and will be elucidated with reference to the embodiments described hereinafter.

DETAILED DESCRIPTION OF THE INVENTION

Figure 1:
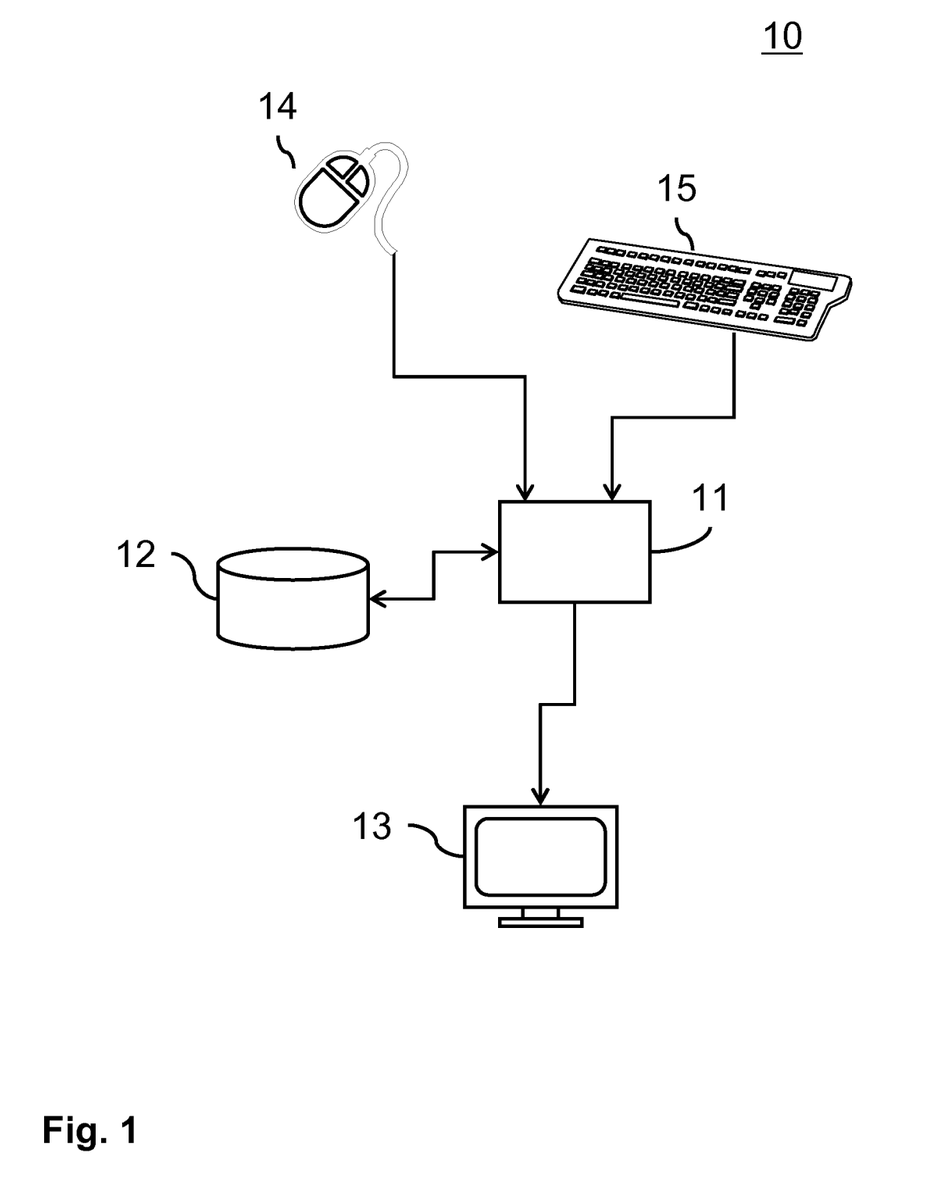
FIG. 1 schematically shows a system for employing the method according to the invention.

FIG. 1 schematically shows a system 10 for employing the method according to the invention. The system 10 may be any type of electronic device having access to stored data and enabling users to use elements from said stored data. The system enables, e.g., viewing, adding, changing and removing data. The system may also allow the user to initiate action for which no stored data is required. For example, the device may allow sending an e-mail or making a phone call. The system 10 may, e.g., be a digital media player (the data source being a collection of media items), an Internet browser (data source=the World Wide Web), an address book, an e-mail application (data source comprises contact details, e-mail history, etc.), a digital version of a dictionary, a mobile phone (data source comprises contact details, sent/received text messages, etc.) or a combination of such systems. All such systems 10 have a number of important features in common.

For example, the system comprises a data storage 12 for storing the data that is used by the device. The data storage 12 may, e.g., be embodied as a hard disk, optical storage medium or solid state memory. The data storage 12 may also be embodied as data connection providing access to the World Wide Web or specific external data sources coupled to a local or wide area network, e.g., via the Internet. The system 10 further comprises a display 13 for providing a graphical user interface. The graphical user interface is designed to allow the user to interact with the device, to select and activate device features, to find and use data from the data source 12, etc. Software for presenting the graphical user interface on the display 13 may be stored on the data source 12 or on a separate data source. The software is run by a processor 11 which is coupled to the data source 12 as well as to the display 13. For enabling the user to control the graphical user interface, user input means like a keyboard 15 and a pointing device 14 (e.g. mouse, trackball, touchpad, joystick) may be provided. The user input means 14, 15 are coupled to the processor. If the display 13 has touch screen functionality, also the display 13 may be considered a user input means.

When used, the system 10 provides a graphical user interface on the screen 13 to enable a user to search for specific data stored on the data storage 12. The user controls the graphical user interface using the input means 14, 15. In the following, it will be explained how the graphical user interface according to the invention allows for very efficient searching.

Figure 2A:
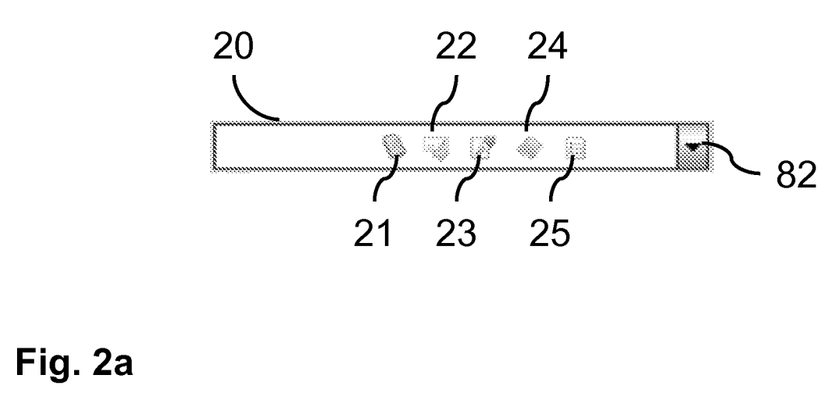
FIG. 2a shows an exemplary search input field according to the invention.

FIG. 2a shows an exemplary search input field 20 according to the invention. This search input field 20 may be part of a graphical user interface displayed at the screen 13 of the system in FIG. 1. In prior art graphical user interfaces, such search entry fields are commonly used for allowing a user to provide a search string. The special search input field 20 according to the invention has the same function, but additionally comprises two or more search domain icons 21-25. According to the invention, the domain icons are part of the search input field 20 and not separate buttons or hyperlinks. In this example five search domain icons 21-25 are provided, i.e. one for phone data 21, one for e-mail data 22, one for memos 23, one for an address book 24 and one for calendar data 25. Obviously, additional or other search domain icons may be provided for other search domains. The domain icons 21-25 in FIG. 2a are a completely symbolic graphical representation of the respective domains. Alternatively, the domain icons 21-25 may comprise text and may even be text-only.

The different search domains may partly cover the same data. The search domain may, e.g., comprise a database or specific records and/or data fields of a database, a list of available e-mail addresses, a file directory comprising images, videos, music, documents or non-specified file types. In principle, any collection of two or more digital items may form a search domain. The search domain, e.g. a database, may be locally available at the data storage 12 of the system 10 or may be accessible via wired and or wireless communication means, e.g. via the Internet.

The search input field 20 further comprises an optional 'recently used' button 82 that will be discussed in detail later with reference to FIG. 7b. In alternative embodiments, the search input field provides multiple input lines. The domain icons 21-25 may then be placed on one or more of the multiple input lines. Optionally, a default and/or a currently active domain icon may be placed on a separate line or may be highlighted.

Figure 2B:
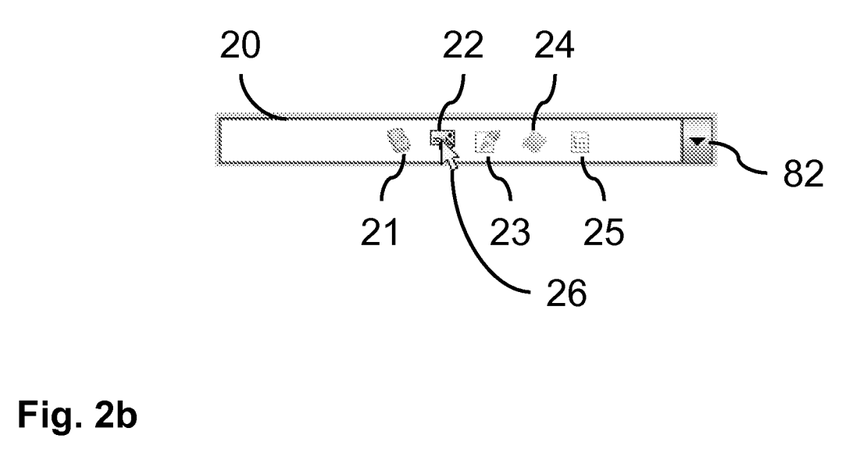
FIG. 2b shows the search input field of FIG. 2a, pointed at with a mouse pointer.

FIG. 2b shows the search input field 20 of FIG. 2a, pointed at with a mouse pointer 26. The mouse pointer 26 is, e.g., moved by the user by moving the mouse 14 of the system 10 shown in FIG. 1. Preferably, when the mouse pointer 26 is moved over one of the search domain icons 21-25, the search domain icon 22 under the mouse pointer 26 is highlighted. In this example, the icon representing the search domain 'e-mail' is highlighted. Highlighting an icon may, e.g., be realized by enlarging it, by changing its colors, by slightly displacing it or by providing some animation effects. In this example, the non-highlighted search domain icons 21, 23, 24, 25 are displayed as semi-transparent icons and the highlighted search domain icon 22 is opaque.

Figure 4A:
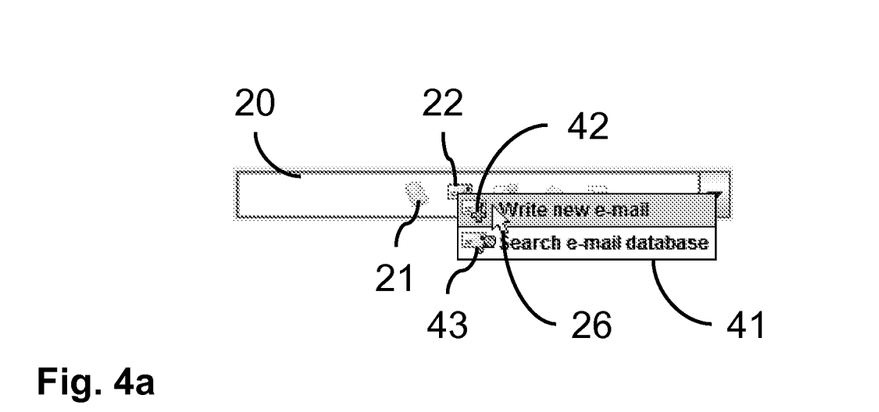
FIGS. 4a and 4b show activation and use of a search field for searching in an e-mail database.

Moving the mouse pointer 26 over the domain icon may also result in additional feedback. For example a text may appear which describes the corresponding domain or an instruction like 'click for selection' may be provided. The feedback may also include showing multiple options for actions relevant for the current domain. An example of the latter is shown in FIG. 4*a*.

The 'e-mail' search domain icon 22 is selected, e.g., when the mouse pointer 26 is above said icon and the user clicks a button of the mouse 14. Alternatively, the positioning of the mouse pointer 26 above the icon itself may already result in the selection of a search domain, possibly after a short delay (activation only occurs when the mouse pointer 26 is above the icon 22 for more than a predetermined number of seconds). It may also be possible to use a short key combination, provided using the keyboard 15, for selecting a search domain. If it is possible to traverse the search domain icons 21-25 using, e.g., the arrow keys or the tab key, selection of a search domain may be realized by providing a selection command (e.g. pressing the return key). A possibility may be provided to select multiple domain icons 21-25 for performing a search in two or more domains simultaneously. The input field may have a default selection of one or more domains for situations in which the user has not (yet) selected one of the domains.

Figure 3A:
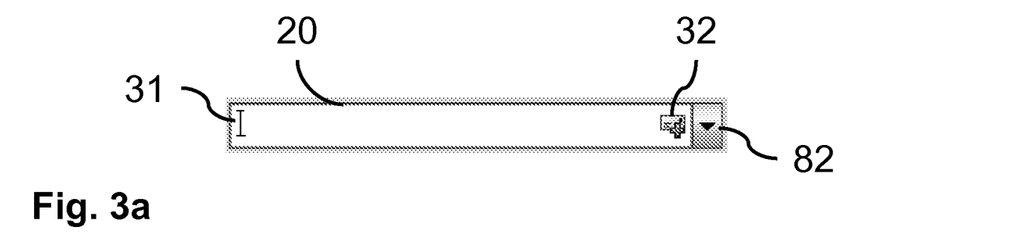
FIGS. 3a, 3b, 3c and 3d show activated and employed search input fields.

FIG. 3*a* shows what the search input field 20 may look like after selection of the e-mail search domain. The search input field 20 now comprises a cursor 31 indicating that a search string may be entered. A domain indicator 32 may indicate which search domain has been selected. In this example, the domain indicator 32 indicates that the 'e-mail' search domain has been selected. The entered search string will therefore be used for searching through, e.g., e-mail addresses, e-mail messages and/or contacts in an address book of whom an e-mail address is available. In addition to searching in the e-mail domain, using the search input field 20 may also cause other actions to be performed. For example, entering an e-mail address in the search input field may open a new e-mail message to said e-mail address, even if the e-mail address is not yet known to the system. Similarly, entering an unknown name may lead to the possibility to add a new contact, preferably with an e-mail address, to the contact list or contact database. When, after selection of a phone icon, a known or unknown phone number is entered, a phone call to said number may be made automatically.

Figure 3B:
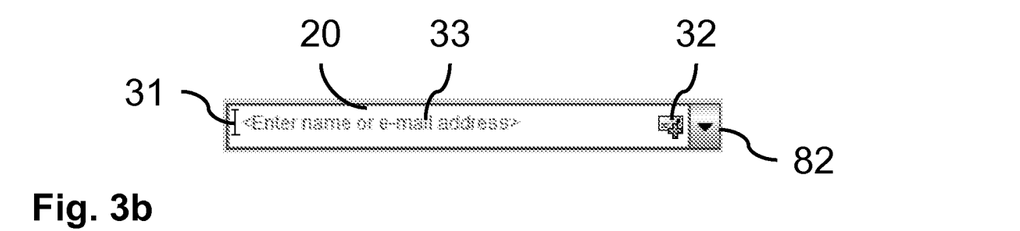

FIG. 3*b* shows a further example of what the search input field 20 may look like after selection of the e-mail search domain. In addition to the items already discussed with reference to FIG. 3*a*, this search input field 20 comprises an informative label 33 which provides information about the input that is expected from the user. In this example, the user is expected to enter a name or e-mail address (or part of it). The text in the informative label 33 is put in between brackets and may have a different color than the search string to be entered by the user (see FIG. 3*c*) in order distinguish it from entered search strings. As soon as the user starts typing, the informative label 33 may disappear.

Figure 3C:
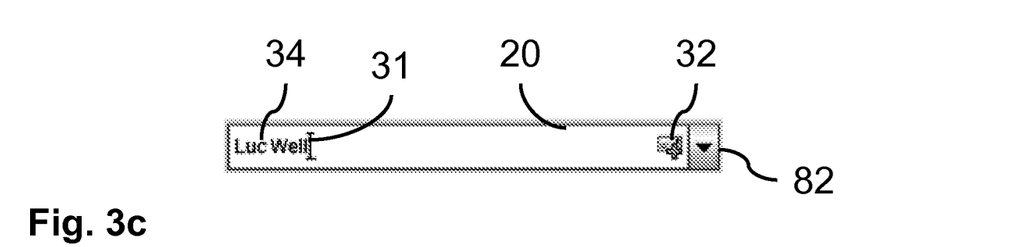

FIG. 3*c* shows a search input field 20 in which a search string 34 or part of a search string 34 has been entered. In this example, the user has chosen to search in the e-mail search domain for the name 'Luc Well' or names comprising or similar to 'Luc Well'.

Figure 3D:
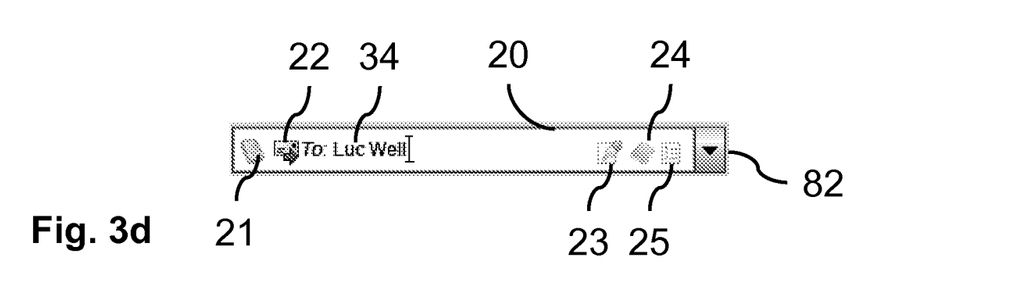

Alternatively (FIG. 3*d*), the search domain icons 21-25 may be kept visible after selection of one of them. This would make it easier to search for the same search string again, but in another search domain. If the domain icons 21-25 are kept visible, they may be rearranged and/or their appearance may be changed dependent on whether the corresponding domain has been selected or not. To assist the user, a 'To:' message may be added to the selected e-mail icon 22 in order to indicate that the program is going to use the entered search string for searching for a contact or e-mail address to send a new e-mail message to.

Figure 4B:
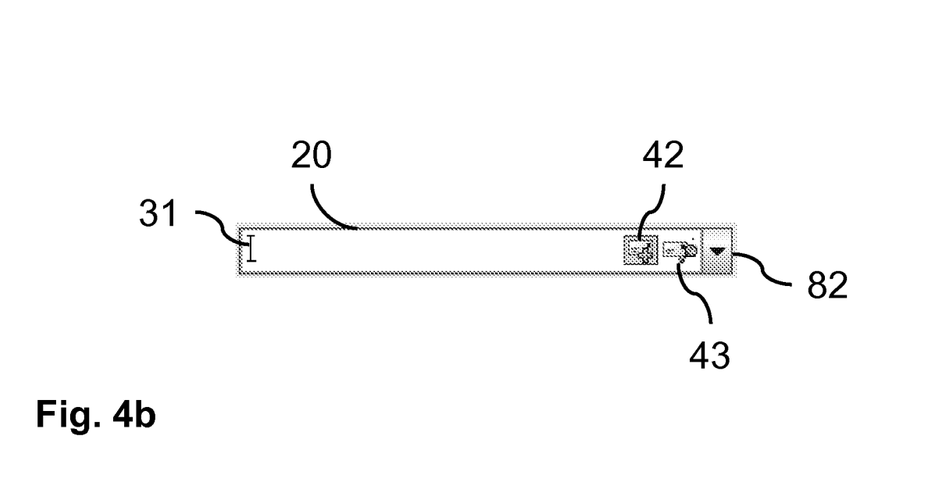

FIGS. 4*a* and 4*b* also show the activation and use of a search field 20 for searching in an e-mail database. In this example two types of searching in the e-mail search domain are available. A first option 42 will use the entered search string 34 to look for a person to send an e-mail message to. A second option 43 will search for the entered search string 34 in previously sent, received or stored e-mail messages. For different options, the system 10 may search in (partly) different parts of the available data. FIG. 4*a* shows how selection of one of the two options may be realized. When the pointer 26 moves over the e-mail search domain icon 22, a sub-menu 41 may appear providing the two options. Clicking on one of the two options may then result in selection of the respective option. Alternatively, the sub-menu 41 is only displayed after clicking on the e-mail search domain icon 22. The options in the sub-menu 41 may be selected using, e.g., a mouse 14 or other type of pointing device or the arrow keys and the return key of the keyboard 15.

After selection of one of the options from the sub-menu 41, the search input field 20 may look like the exemplary search input field 20 of FIG. 4*b*. Alternatively, the configuration of FIG. 4*b* is provided directly after selecting the e-mail domain icon 22 in the search input field 20 of FIGS. 2*a* and 2*b*. Then, in FIG. 4*b*, the first option 42 ('write new e-mail') is the default selection. In this search input field 20, two search domain indicators 42, 43 are displayed. The 'write e-mail' icon 42 is currently active, which is apparent from the fact that it is highlighted by placing it in a box with a different background color. The user may, e.g., switch to the other option by clicking on the inactive 'search e-mail database' icon 43. It is to be noted that the sub-menu 41 of FIG. 4*a* is not necessary for providing two different options within the e-mail search domain. Selection of the e-mail search domain may directly result in displaying the search input field 20 as shown in FIG. 4*b* with, e.g., the 'write e-mail' icon 42 being selected as the standard option.

Figure 5:
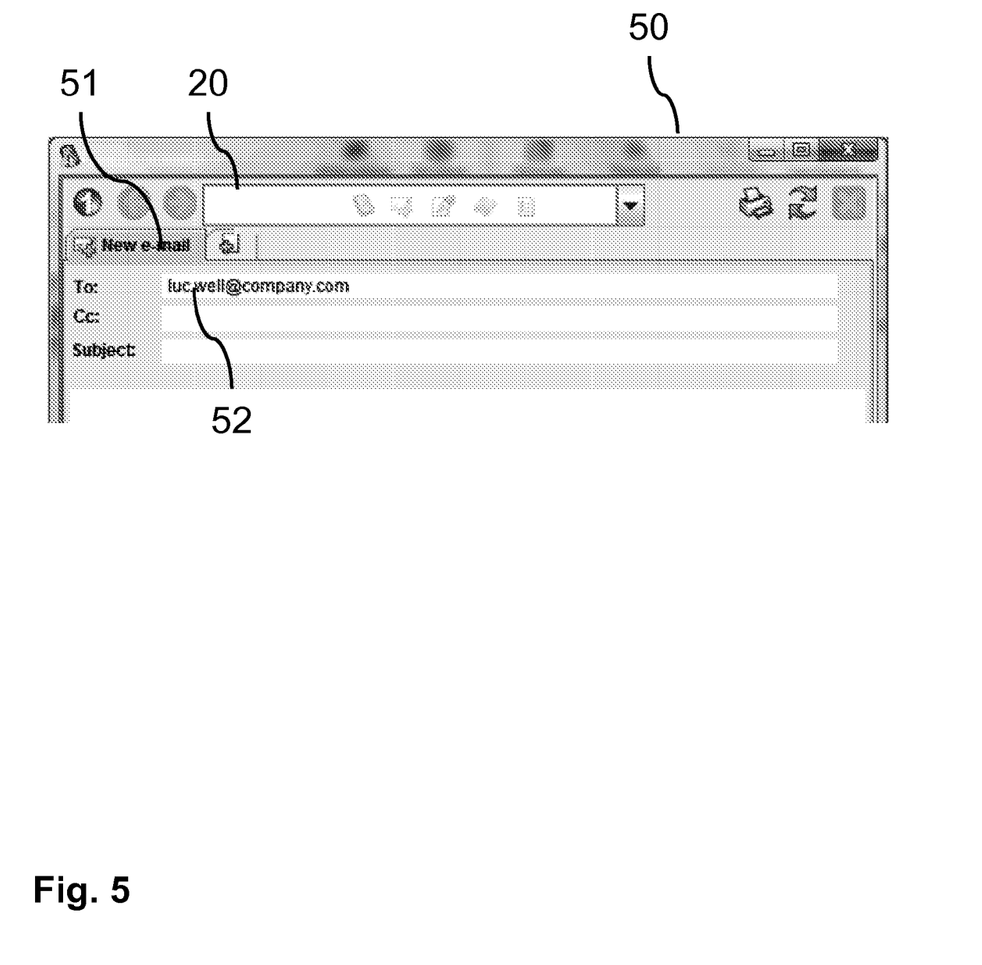
FIG. 5 shows an exemplary result of a search.

FIG. 5 shows an exemplary result of a search in the e-mail domain. FIG. 5 shows an application window 50 comprising the search input field 20 according to the invention. When the user gives a search command, e.g. by pressing the return key or clicking on a button in the graphical user interface after entering the search string 34 of FIG. 3*c*, the processor 11 of the system generates a search query and performs a search for the search string in the data stored in the data storage 12. The search query comprises the search string and the selected search domain. In this example, the name 'Luc Wells' (search string) was found in a database with e-mail addresses (search domain). Upon finding this name in the database, a new-mail form 51 is opened, with the e-mail address 52 of the person 'Luc Wells' already filled in.

Obviously, the e-mail address 52 shown in FIG. 5 may result from many different search strings. For example, the search string may have comprised (part of) the name of the person to whom the e-mail address 52 belongs or (part of) the name of the company represented by the domain name in the e-mail address 52. If the complete e-mail address 52 was entered in the search input field 20, the partly filled in form 51 of FIG. 5 may even have been provided without performing any search at all.

Figure 6A:
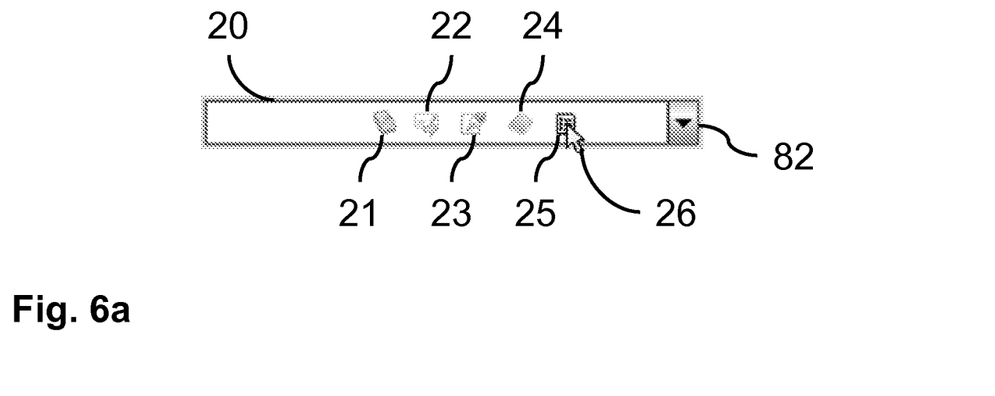
FIGS. 6a and 6b illustrate the application of the invention to searching calendar data.
Figure 6B:
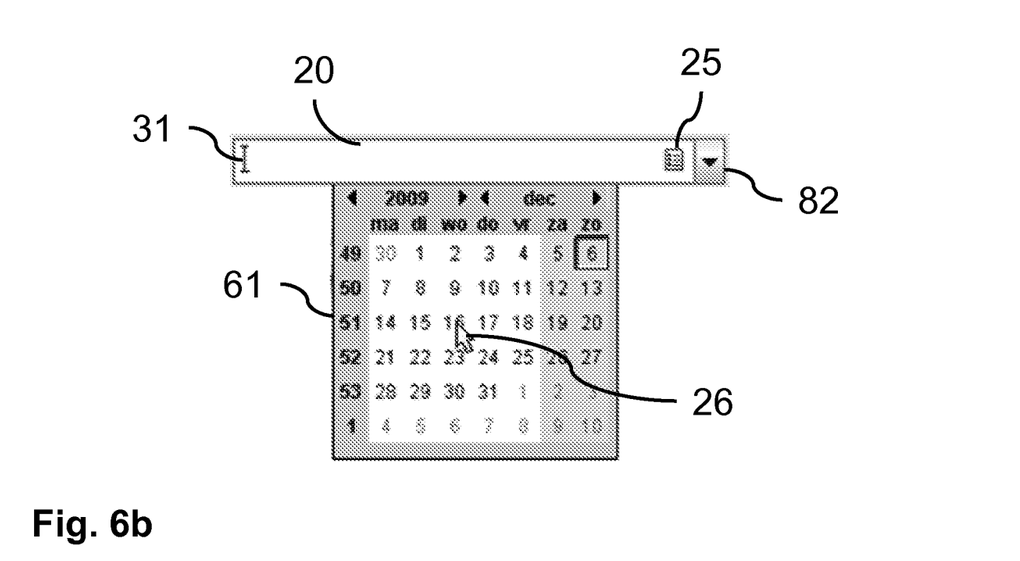

FIGS. 6*a* and 6*b* illustrate the application of the invention to searching, adding or amending calendar data. FIG. 6*a* shows the same search input field 20 as already shown in FIGS. 2a and 2b, but now with the mouse pointer 26 hovering above the calendar icon 25. When the now highlighted calendar icon 25 is selected, the search input field 20 is adapted to facilitate searching and/or editing calendar data as can be seen in FIG. 6b. The cursor 31 indicates that the user may enter a search string. The search string may be (part of) a date or time, a name of someone with whom the user has made an appointment, an address of an upcoming event or any other type of data that may be part of the available calendar/agenda data. In addition to the possibility to enter a search string, the search input field 20 also provides the option to select a date from the calendar 61. Strings entered in the search input field may be used for searching through previously stored calendar data or for adding new calendar items. When a date is selected, either by selecting a date from the calendar 61 or by entering a date in the search input field 20, the already stored appointments for that date may be shown and/or new appointments may be added.

Figure 7A:
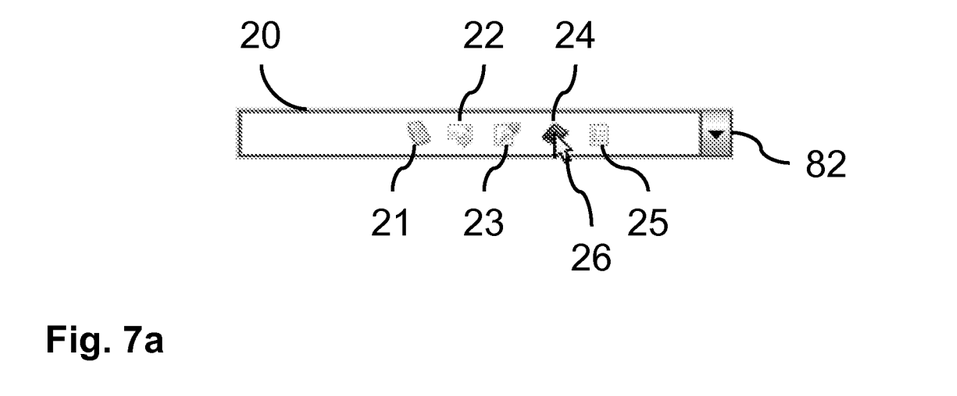
FIGS. 7a and 7b illustrate the application of the invention to searching address book data.
Figure 7B:
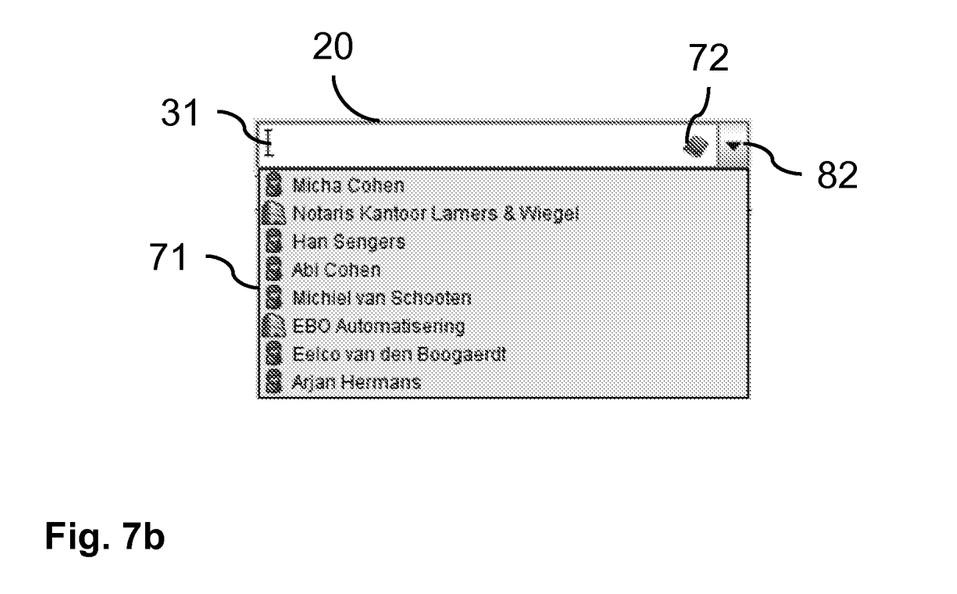

FIGS. 7a and 7b illustrate the application of the invention to searching address book data. FIG. 7a shows the same search input field 20 as already shown before, but now with the mouse pointer 26 hovering above the address book icon 24. By selecting the address book icon 24, the user chooses to search in his address book data. As shown in FIG. 7b, selection of the address book search domain is again followed by providing the cursor 31. An optional domain indicator 72 indicates that the currently selected search domain is the user's address book. The domain indicator 72 may have a different appearance than the corresponding domain icon before selection. For example, the colors may be changed or the domain indicator may be text only or supplemented with text. Search strings entered in the search input field 20 may be used for finding and displaying contact data of persons or companies matching the search string. The displayed contact data may then, e.g., be amended or used for sending a letter or making a phone call. When the search string does not provide any match with the data in the address book, a 'new address' form may be opened.

When the address book search domain is selected, a list 71 with recently used addresses appears. Instead of entering a search string, the user may select one of the recently used addresses from the list 71. The list 82 with recently used addresses may alternatively be called by using a drop down icon 82, which is provided at the right side of the search input field 20.

The drop down icon 82 is also shown in many of the above described figures and may also be used in combination with other search domains. When clicking on the drop down icon 82, or by selecting this function in any other way (e.g. short key combination), a list of most recently used items in the selected search domain may be displayed. If no search domain has been selected yet, clicking on the drop down icon 82 may, e.g., result in a list with recently used items from multiple search domains or from a predetermined search domain.

Figure 8:
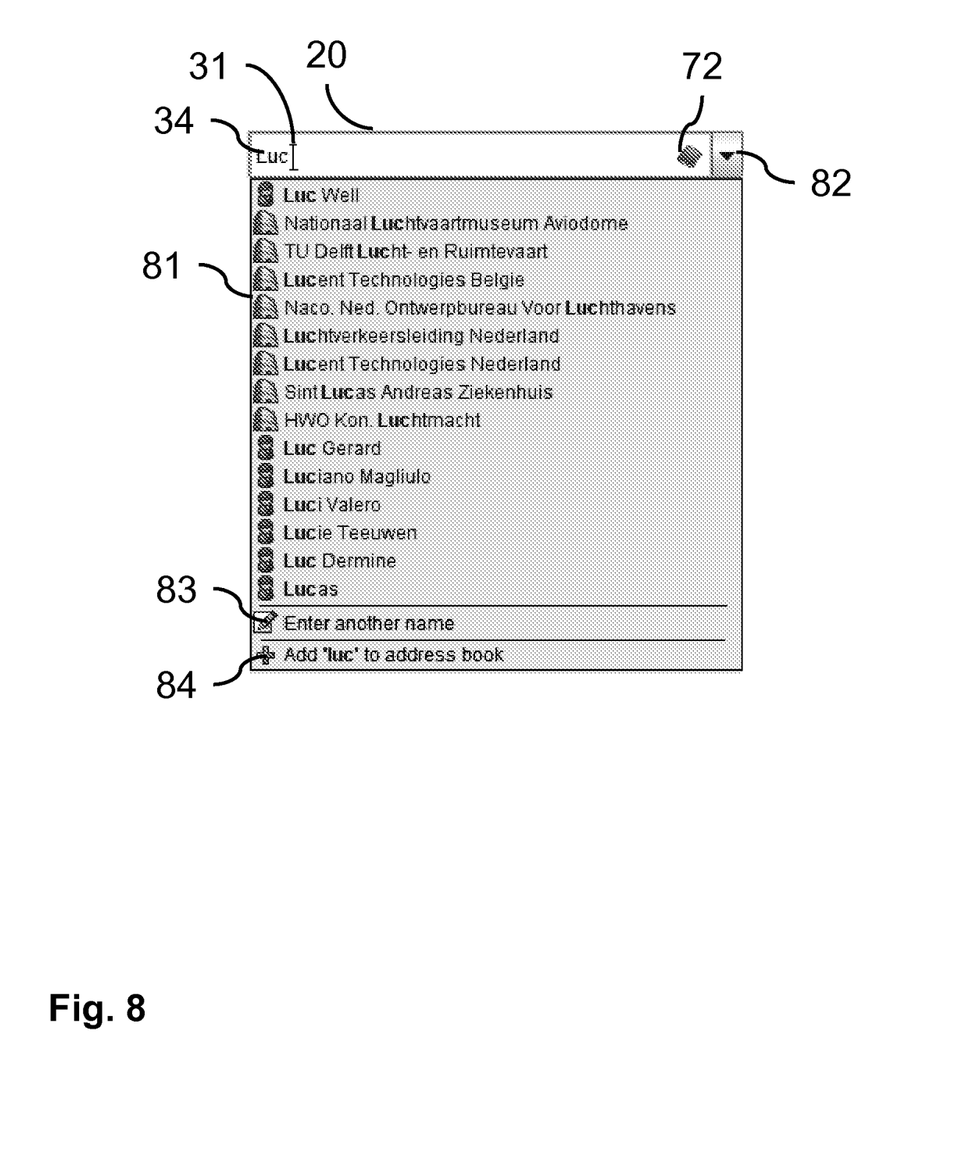
FIG. 8 shows an example of searching while a search string is being entered.

FIG. 8 shows an example of searching while a search string is being entered. As described before, the processor 11 may be instructed to generate a search query and perform a search in response to a search command from the user (e.g. pressing return key, clicking on a search button). Alternatively, the searching may already start as soon as the user starts entering the search string 34. FIG. 8 shows an example in the address book search domain. While the user is typing the name 'Luc Well' again, the system already starts searching. At the moment corresponding to what is shown in FIG. 8, the user has only entered the first three characters 'Luc' of the search string 34 he wants to enter. In the preliminary search results 81 all address book data comprising the characters 'Luc' are shown. With every character of the entered search string 34 which is added, deleted or replaced, a new search may be performed or the results already on the preliminary search results 81 may be filtered in accordance with the new search string 34. Using, e.g., the arrow keys or the mouse pointer the user may select items from the list and the corresponding contact data may be displayed. In addition to names of people and organizations in the address book, the result list 81 also provides an option 83 to enter another name instead of the already entered 'Luc' and an 'Add Luc' option 84 for making it possible to add new records to the address book database.

Figure 9A:
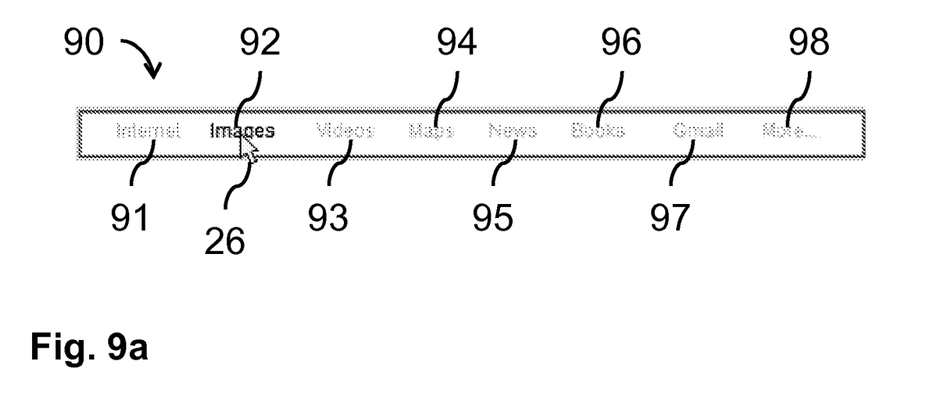
FIGS. 9a, 9b, 10a and 10b show exemplary search input field used for searching information on the World Wide Web.
Figure 9B:
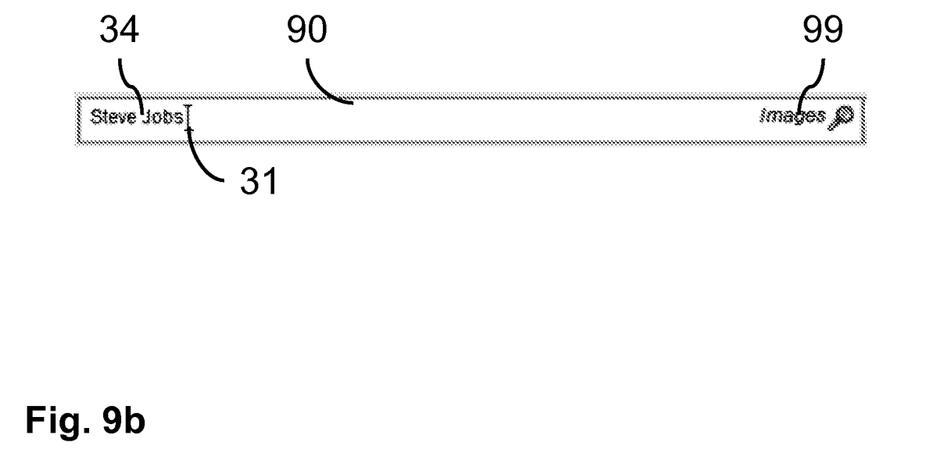

FIGS. 9a, 9b, 10a and 10b show exemplary web search input field 90 used for searching information on the World Wide Web. The web search input 90 works in a way similar to the search input field 20 of FIG. 2a. When selecting one of the search domain icons 91, 92, 93, 94, 95, 96, 97 the web search input field 90 may be changed into the web search input field shown in FIG. 9b. In FIG. 9b, the web search input field 90 has a search domain indicator 99, showing that the search string 34 will be used for searching in the 'Images' domain. A possibility may be provided to select multiple domain icons 91-97 for performing a search in two or more domains simultaneously. When no search domain icon is selected at all, the search may be performed in one or more default domains.

Figure 10A:
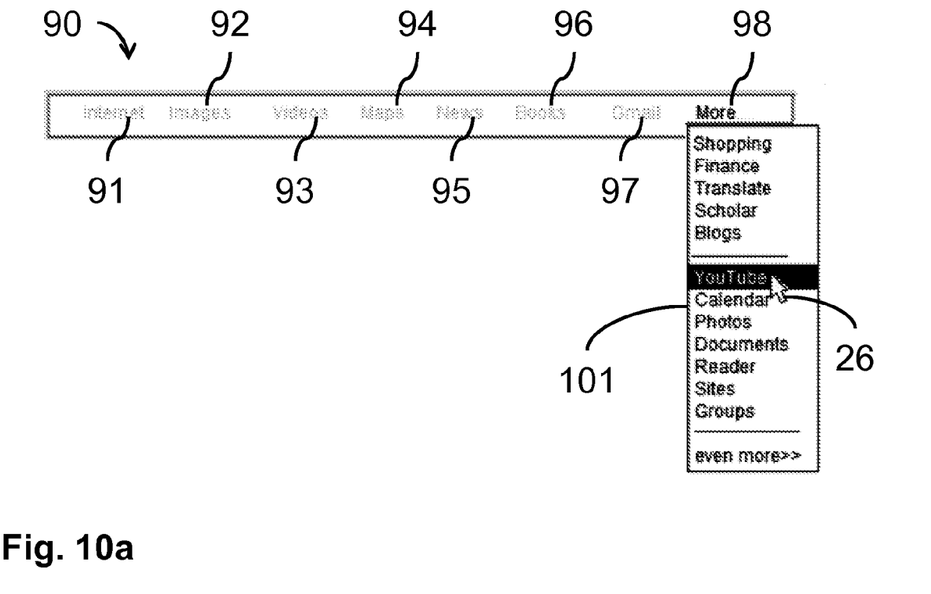
Figure 10B:
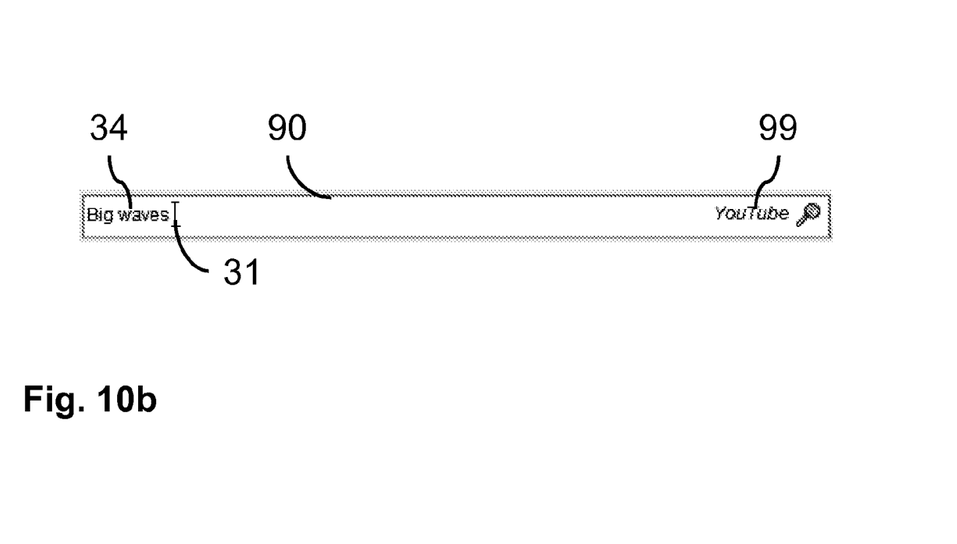

When there are too many search domains available for selection to show in the web search input field 90, the embodiment shown in FIG. 10a may be used. When selecting (e.g. clicking, positioning the mouse pointer 26, keyboard interaction) the 'More' domain icon 98, additional search domains may be offered for selection in a list 101. FIG. 10b shows the web search input field after selection of the 'YouTube' domain from this list.

Figure 11:
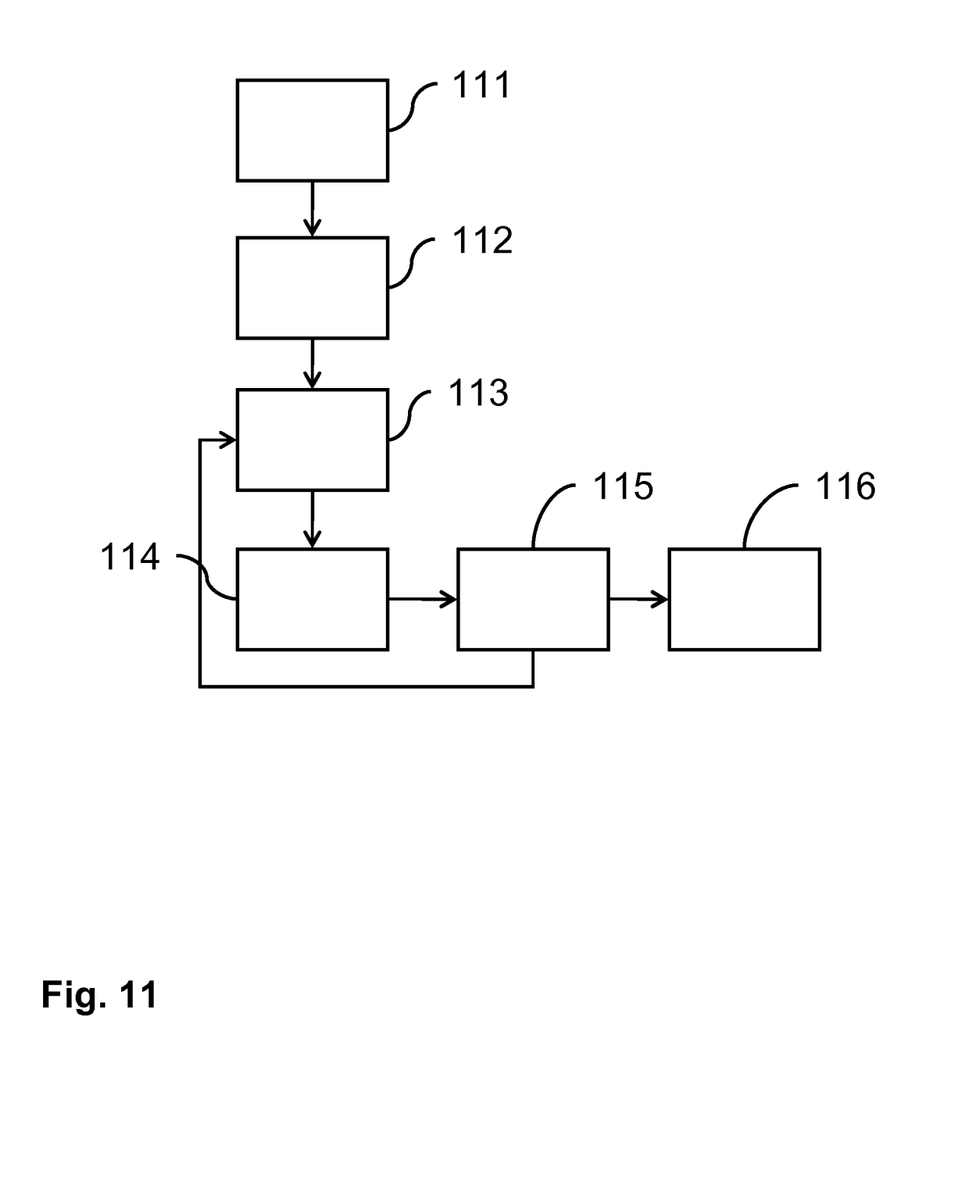
FIG. 11 shows a flow diagram of a method according to the invention.

FIG. 11 shows a flow diagram of a method of searching according to the invention. The method starts with a display step 111 for providing a graphical representation of a search input field with at least two domain icons. Each domain icon represents a search domain. In search input field activation step 112, the user selects the search input field by selecting one of the at least two domain icons. After activation of the search input field the user can enter a search string. The system performing the search then receives the entered search string in search string receiving step 113. In search query generating step 114, the selected search domain and the entered search string are used for generating a search query. In search step 115, the generated search query is performed. Search query generating step 114 and search step 115 may be performed only when the user gives a search command (e.g. by pressing a specific key or clicking on a button in the graphical user interface). Alternatively, the search query generating step 114 and search step 115 are performed each time the search string in the search input field is amended, thereby continuously updating the search results in accordance with the user input already available. The results of the performed search are presented to the user in results presentation step 116. When the complete method has been performed, the input field 20 may be re-initialized by providing the initial graphical representation of the display step 111. Alternatively, the input field may keep on showing information concerning the just completed action, for example the search string and/or an indication of the used search domain. Re-initialization of the input field may also occur upon an escape command from the user. Such an escape command may, e.g., be provided using an escape key on the keyboard or by clicking on an escape button in the graphical user interface. It is to be noted that also other features described above with reference to FIGS. 1 to 10 may be comprised in this method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for generating a search query using a graphical user interface, the method comprising:
    providing a graphical representation of a search input field comprising at least two domain icons, each domain icon representing a search domain, the search input field having the function of allowing a user to provide a search string, the at least two domain icons being within the search input field,
    activating of the search input field upon a user selection of one of the at least two domain icons,
    receiving the search string entered by the user, and
    generating the search query based on the entered search string and the search domain represented by the selected domain icon.

2. The method for generating a search query according to claim 1, wherein the user selection of the one of the at least two domain icons only involves a single click on the one of the at least two domain icons.

3. The method for generating a search query according to claim 1, wherein the user selection of the one of the at least two domain icons only involves moving a pointer over the one of the at least two domain icons.

4. The method for generating a search query according to claim 1, wherein the method further comprises highlighting the one of the at least two domain icons in response to moving a pointer over said domain icon.

5. The method for generating a search query according to claim 1, wherein the generating of the search query is performed upon receiving a search command provided by the user.

6. The method for generating a search query according to claim 1, wherein the generating of the search query is performed upon a change of the entered search string by the user.

7. The method for generating a search query according to claim 1, wherein the method further comprises:
    performing the search query for obtaining a search result,
    graphically representing the search result.

8. The method for generating a search query according to claim 1, wherein the domain icons are kept visible after selection of one of them, and the method comprises the steps of:
    rearranging the domain icons dependent on whether the corresponding domain has been selected or not and/or changing the appearance of the domain icons dependent on whether the corresponding domain has been selected or not.

9. A tangible carrier being a non-transitory device or non-transitory medium carrying a computer program for generating a search query, wherein the computer program comprises instructions that cause a processor to perform the method as claimed in claim 1, when the computer program is being executed by the processor.

10. An electronic device comprising a display, an input means and a processing means, all operatively coupled in order to provide a graphical user interface, the processor being configured to:
    provide, on the display, a graphical representation of a search input field comprising at least two domain icons, each domain icon representing a search domain, the search input field having the function of allowing a user to enter a search string, the at least two domain icons being within the search input field,
    activate the search input field upon a user selection of one of the at least two domain icons, to receive the search string entered by the user, and to
generate a search query based on the entered search string and the search domain represented by the selected domain icon.

11. The tangible carrier according to claim 10, including a storage medium being one of:
a ROM, a CD Rom, a semiconductor ROM, a magnetic recording medium, a floppy disk or a hard disk.

* * * * *